(12) United States Patent
Ali et al.

(10) Patent No.: US 6,514,599 B1
(45) Date of Patent: Feb. 4, 2003

(54) INKJET RECEPTOR MEDIUM HAVING A MULTI-STAGED INK MIGRATION INHIBITOR AND METHOD OF MAKING AND USING SAME

(75) Inventors: Mahfuza B. Ali, Mendota Heights, MN (US); Clinton P. Waller, Jr., White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/550,496

(22) Filed: Apr. 14, 2000

Related U.S. Application Data

(63) Continuation-in-part of application No. 09/293,542, filed on Apr. 16, 1999, now abandoned.

(51) Int. Cl.$^7$ .............................. B32B 27/14; B32B 3/00
(52) U.S. Cl. ..................... 428/195; 428/304.4; 428/323
(58) Field of Search .............................. 428/195, 304.4, 428/323

(56) References Cited

U.S. PATENT DOCUMENTS

| | | | |
|---|---|---|---|
| 4,247,498 A | 1/1981 | Castro ........................ 264/41 |
| 4,419,388 A | 12/1983 | Sugiyama ................... 427/288 |
| 4,474,847 A | 10/1984 | Schroder et al. ........... 428/323 |
| 4,539,256 A | 9/1985 | Shipman ................. 428/315.5 |
| 4,547,405 A | 10/1985 | Bedell et al. ............... 427/256 |
| 4,554,181 A | 11/1985 | Cousin et al. ............. 427/261 |
| 4,613,441 A | 9/1986 | Kohno et al. .......... 210/500.36 |
| 4,649,064 A | 3/1987 | Jones ......................... 427/256 |
| 4,726,989 A | 2/1988 | Mrozinski ................ 428/315.5 |
| 4,732,986 A | 3/1988 | Patterson et al. ........... 427/261 |
| 4,741,969 A | 5/1988 | Hayama et al. ............. 428/514 |
| 4,775,594 A | 10/1988 | Desjarlais ................... 428/421 |
| 4,781,985 A | 11/1988 | Desjarlais ................... 428/421 |
| 4,867,881 A | 9/1989 | Kinzer ....................... 210/490 |
| 4,877,680 A | 10/1989 | Sakaki et al. ............... 428/332 |
| 4,892,779 A | 1/1990 | Leatherman et al. ........ 428/220 |
| 4,903,039 A | 2/1990 | Light .......................... 346/1.1 |
| 4,903,040 A | 2/1990 | Light .......................... 346/1.1 |
| 4,935,307 A | 6/1990 | Iqbal et al. .................. 428/500 |
| 4,954,395 A | 9/1990 | Hasegawa et al. ........ 428/318.4 |
| 5,079,319 A | 1/1992 | Mueller ................. 526/238.23 |
| 5,084,340 A | 1/1992 | Light .......................... 428/327 |
| 5,102,731 A | 4/1992 | Takimoto et al. ........... 428/323 |
| 5,120,594 A | 6/1992 | Mrozinski ................... 428/195 |
| 5,126,194 A | 6/1992 | Light .......................... 428/327 |
| 5,126,195 A | 6/1992 | Light .......................... 428/327 |
| 5,141,790 A | 8/1992 | Calhoun et al. .............. 428/40 |
| 5,147,410 A | 9/1992 | Heindl et al. .................. 8/555 |
| 5,156,674 A | 10/1992 | Cells .......................... 106/20 |
| 5,206,071 A | 4/1993 | Atherton et al. ............ 428/195 |
| 5,208,092 A | 5/1993 | Iqbal .......................... 428/195 |
| 5,220,346 A | 6/1993 | Carreira et al. |
| 5,229,207 A | 7/1993 | Paquette et al. ............ 428/355 |
| 5,262,238 A | 11/1993 | Trouve et al. .............. 428/402 |
| 5,296,277 A | 3/1994 | Wilson et al. ................ 428/40 |
| 5,302,437 A | 4/1994 | Ideki et al. .................. 428/195 |
| 5,342,688 A | 8/1994 | Kitchin ....................... 428/402 |
| 5,362,516 A | 11/1994 | Wilson et al. ............. 427/207.1 |
| 5,374,475 A | 12/1994 | Walchi ..................... 428/304.4 |
| 5,380,044 A | 1/1995 | Aitkens et al. ............... 283/67 |
| 5,389,723 A | 2/1995 | Iqbal et al. .................... 525/57 |
| 5,428,383 A | 6/1995 | Shields et al. ................ 347/96 |
| 5,429,860 A | 7/1995 | Held et al. ................... 428/195 |
| 5,443,727 A | 8/1995 | Gagnon ....................... 210/490 |
| 5,445,868 A | 8/1995 | Harasawa et al. .......... 428/206 |
| 5,500,668 A | 3/1996 | Mulhotra et al. ............ 347/105 |
| 5,518,534 A | 5/1996 | Pearlstine et al. ............ 106/20 |
| 5,537,137 A | 7/1996 | Held et al. ................... 347/105 |
| 5,569,529 A | 10/1996 | Becker et al. ............... 428/331 |
| 5,605,750 A | * 2/1997 | Romano et al. ......... 428/304.4 |
| 5,624,484 A | 4/1997 | Takahashi et al. ........ 106/31.75 |
| 5,640,187 A | 6/1997 | Kashiwazakii et al. ..... 347/101 |
| 5,677,067 A | 10/1997 | Kojima et al. |
| 5,679,143 A | 10/1997 | Looman .................... 106/20 R |
| 5,681,660 A | 10/1997 | Bull et al. ................... 428/500 |
| 5,683,793 A | 11/1997 | Malhotra et al. ........... 428/216 |
| 5,686,602 A | 11/1997 | Farooq et al. ............... 536/101 |
| 5,688,603 A | 11/1997 | Iqbal et al. .................. 428/532 |
| 5,695,820 A | 12/1997 | Davis et al. ................. 427/261 |
| 5,707,722 A | 1/1998 | Iqbal et al. ................ 428/304.4 |
| 5,731,430 A | 3/1998 | Fuertes et al. ................ 536/58 |

(List continued on next page.)

FOREIGN PATENT DOCUMENTS

| | | | |
|---|---|---|---|
| DE | 196 28 341 | 9/1998 | ............ B41M/5/00 |
| EP | 0 199 874 | 11/1986 | ............ B41M/1/36 |

(List continued on next page.)

OTHER PUBLICATIONS

Porterfield, William J., *Inorganic Chemistry*, Addison–Wesley Publishing Company, Inc., p. 133 (1984).
*Encyclopedia of Polymer Science and Engineering*, vol. 17, pp. 204–214, 229, 234–235, John Wiley & Sons, Inc. (1989).
R.E. Kestings, *Synthetic Polymeric Membranes*: Structururual Perspective, 2d ed., John Wiley & Sons, 1985 Chapter 7, pp. 237–285.
Hornby et al., "Acrylidone Anionic Copolymers," International Specialty Products (brochure), Reprinted from *Soap/Cosmetics/Chemical Specialties* (Jun. 1993) 5 pgs.
International Specialty Products (brochure), Industrial Reference Guide, "Polymers—Polyvinylpryrrolidone," 2 pgs.
International Specialty Products (brochure), "Polyvinylpyrrolidone Polymers, PVP", 16 pgs.
International Specialty Products (brochure), "Acrylidone™ Anionic Polymers," 6 pgs.

*Primary Examiner*—Cynthia H. Kelly
*Assistant Examiner*—B. Shewareged
(74) *Attorney, Agent, or Firm*—Dale A. Bjorkman; Carolyn V. Peters

(57) ABSTRACT

A polymer useful for a multi-stage inhibiting of the migration of pigmented inks in porous inkjet receptor media is disclosed. The polymer is quite soluble in water and has quaternary amine functional groups. Methods of making and using such polymer are also disclosed.

22 Claims, 8 Drawing Sheets

U.S. PATENT DOCUMENTS

| | | | |
|---|---|---|---|
| 5,747,148 A | 5/1998 | Warner et al. | 428/212 |
| 5,789,342 A | 8/1998 | Evans et al. | 503/227 |
| 5,800,919 A | 9/1998 | Peacock et al. | 428/355 |
| 5,863,662 A | 1/1999 | Hornby et al. | 428/483 |
| 5,874,143 A | 2/1999 | Peloquin et al. | 428/40.1 |
| 5,885,337 A | 3/1999 | Nohr et al. | 106/31.27 |
| 6,054,213 A | 4/2000 | Peacock et al. | 428/355 |
| 6,071,614 A | 6/2000 | Farooq | |
| 6,177,187 B1 | 1/2001 | Niemoller et al. | 428/327 |

FOREIGN PATENT DOCUMENTS

| | | | | |
|---|---|---|---|---|
| EP | 0 457 728 A1 | 11/1991 | | D06P/3/62 |
| EP | 0 570 515 B1 | 11/1993 | | C09J/7/02 |
| EP | 0 614 771 A1 | 9/1994 | | B41N/3/03 |
| EP | 0 627 324 A1 | 12/1994 | | B41M/5/00 |
| EP | 0 661 168 A3 | 7/1995 | | B41M/5/00 |
| EP | 0 667 246 A1 | 8/1995 | | B41M/5/00 |
| EP | 0 673 782 A2 | 9/1995 | | B41M/5/00 |
| EP | 0 716 931 A1 | 6/1996 | | B41M/5/00 |
| EP | 0 736 392 | 10/1996 | | B41M/5/00 |
| EP | 0 791 473 A2 | 8/1997 | | B41M/3/00 |
| EP | 0 839 880 A1 | 5/1998 | | C09D/11/00 |
| EP | 0 876 914 A1 | 11/1998 | | B41J/2/01 |
| EP | 0 878 319 A2 | 11/1998 | | B41M/5/00 |
| EP | 0 894 641 | 2/1999 | | B41M/5/00 |
| EP | 0 897 808 A1 | 2/1999 | | B41M/5/00 |
| GB | 2 147 003 | 5/1985 | | C09D/11/02 |
| JP | 61 063476 | 1/1986 | | B41M/5/00 |
| JP | 61-41585 | 2/1986 | | B41M/5/00 |
| JP | 61-261089 | 11/1986 | | B41M/5/00 |
| WO | WO 93/01938 | 2/1993 | | B41M/5/00 |
| WO | WO93/25595 | 12/1993 | | |
| WO | WO 95/28285 | 10/1995 | | B41M/5/00 |
| WO | WO 96/18496 | 6/1996 | | B23B/3/00 |
| WO | WO 97/20697 | 6/1997 | | B41M/5/00 |
| WO | WO97/33758 | 9/1997 | | B41M/5/00 |
| WO | WO 98/02314 | 1/1998 | | B41M/5/00 |
| WO | WO 98/05504 | 2/1998 | | B41J/2/01 |
| WO | WO 98/05512 | 2/1998 | | B41M/5/00 |
| WO | WO98/29516 | 7/1998 | | C09J/7/02 |
| WO | WO 98/30749 | 7/1998 | | D06P/5/00 |
| WO | WO 99/03685 | 1/1999 | | B41M/5/00 |
| WO | WO 99/06216 | 2/1999 | | B41M/5/00 |
| WO | WO 99/07588 | 2/1999 | | B41M/5/00 |

\* cited by examiner

INKJET RECEPTOR MEDIUM HAVING A MULTI-STAGED INK MIGRATION INHIBITOR AND METHOD OF MAKING AND USING SAME

This is a continuation in part of application Ser. No. 09/293,542, filed Apr. 16, 1999, now abandoned.

COLOR PHOTOGRAPHS

The file of this patent contains at least one drawing executed in color. Copies of this patent with color drawings will be provided by the Patent and Trademark Office upon request and payment of the necessary fee.

FIELD OF INVENTION

This invention relates to a microporous inkjet receptor that provides excellent images with pigmented inks deposited thereon in a manner that impedes migration of the pigmented inks when in contact with water.

BACKGROUND OF INVENTION

Inkjet imaging techniques have become vastly popular in commercial and consumer applications. The ability to use a personal computer and desktop printer to print a color image on paper or other receptor media has extended from dye-based inks to pigment-based inks. The latter provide brilliant colors and more durable images because pigment particles are contained in a dispersion before being dispensed using a thermal inkjet print head, such as those commercially available from Hewlett Packard Corporation or LexMark Corporation in inkjet printers commercially available from Hewlett Packard Corporation, Encad Inc., Mimaki Corporation, Epson Corporation, and others.

Ink jet printers have been in general use for wide-format electronic printing for applications such as, for example, engineering and architectural drawings. Because of the simplicity of operation, economy of ink jet printers, and improvements in ink technology, the inkjet imaging process holds a superior growth potential for the printing industry to produce wide format, image on demand, presentation quality durable graphics.

The components of an ink jet system used for making graphics can be grouped into three major categories:

1 Computer, software, printer;
2 Ink; and
3 Receptor sheet.

The computer, software, and printer will control the size, number and placement of the ink droplets and will transport the receptor film. The ink will contain the colorant or pigments which form the image. The receptor film will provide the medium which accepts and holds the ink. The quality of the ink jet image is a function of the total system. However, the composition and interaction between the ink and receptor film is most important in an ink jet system.

Image quality is what the viewing public and paying customers will want and demand to see. Many other demands are also placed on the ink jet media/ink system from the print shop, such as rapid drying, humidity insensitivity, extended shelf life, waterfastness and overall handleability. Also, exposure to the environment can place additional demands on the media and ink (depending on the application of the graphic).

Porous membrane is a natural choice to use as an ink jet receptive medium because the capillary action of the porous membrane can wick the ink into the pores much faster than the absorption mechanism of film forming water soluble coatings. However, in the past, when a porous coating or film has been employed to achieve desired quick dry, optical density has suffered greatly because the colorant penetrates too deep into the porous network. This type of problem is magnified by printers that dispense high volumes of ink per drop because extra film thickness may be required to hold all the ink. When the pore size and pore volume of the membrane are opened to allow the pigments to penetrate, the pigments can be stratified in the membrane. Meaning, the black, cyan, magenta, and yellow will be predominately found at different depths depending on the order of application. Hence, some of the first color(s) applied is/are optically trapped in the image by subsequent application of other pigmented ink. Furthermore, lateral diffusion of the ink can also be a problem inherent in porous membranes used as receptive media. When pigmented inks are jetted onto a porous film that has a pore size that is too small, color pigments will be filtered on the top of the membrane rendering high image density, but the pigments could easily smear and have the effect of never drying. Also, excess fluid from the ink can coalesce, or even worse, pool and run on the image before the water/glycol carrier is wicked away.

The chemical formulation of the pigmented inkjet ink has considerable complexity due to the requirement of continued dispersion of the pigment particles in the remainder of the ink and during jetting of the ink.

The typical consumer medium for receiving dye-based inkjet inks has been paper or specially coated papers. However, with too much inkjet ink in a given area of the paper, one can see the over-saturation of the paper with the aqueous ink in which dye was dissolved.

As inkjet inks have become more commercially oriented and pigmented-based inks have become more prevalent, different media have been tried in an attempt to control the management of fluids in the ink.

Japanese Patent JP 61-041585 discloses a method for producing printing material using a ratio of PVA/PVP. The disadvantage is inadequate waterfastness and wet rub off properties.

Japanese Patent JP61-261089 discloses a transparent material with cationic conductive resin in addition to a mixture of PVA/PVP. The material is water fast and smudge proof but the wet rub off properties are poor.

European Patent Publication EP 0 716 931 A1 discloses a system using a dye capable of co-ordinate bonding with a metal ion in two or more positions. Again binder resins are used with inorganic pigments in the paper or film. The metal ion was preferred to be jetted on before imaging and additional heating is necessary to complete the reaction. This system was not claiming to be water fast; the focus was long term storage without fading from heat or light.

U.S. Pat. No. 5,537,137 discloses a system to achieve waterfastness by curing with heat or UV light. In the body of the patent, examples of their coatings contained $Ca^{++}$ from $CaCl_2$. This was added to provide reactive species for the acid groups on the dispersed polymer. The coating remains water soluble until UV or heat curing after imaging.

Hence, the current special ink jet media employ vehicle absorptive components, and sometimes optional additives to bind the inks to the media. As a consequence current media are inherently moisture sensitive and can be fragile to handling and subject to finger smearing. Moreover, the vehicle absorptive components usually consist of water soluble (or swelling) polymers which result in slower printing speeds and dry times.

Pigmented ink delivery systems have also dealt with pigment management systems, wherein the resting location of the pigment particles are managed to provide the best possible image graphic. For example, U.S. Pat. No. 5,747, 148 (Warner et al.), discloses a pigment management system in which a suitable supporting layer (including in a listing a microporous layer) has a two layer fluid management system: a protective penetrant layer and a receptor layer, both layers containing filler particles to provide two different types of protrusions from the uppermost protective penetrant layer. Electron microphotographs in that application show how the pigment particles of the ink encounter smooth protrusions that provide a suitable topography for pigment particle "nesting" and rocky protrusions that assist in media handling and the like.

Other ink receptors have been disclosed, including U.S. Pat. No. 5,342,688 (Kitchin); U.S. Pat. Nos. 5,389,723 and 4,935,307 (both Iqbal et al.); U.S. Pat. No. 5,208,092 (Iqbal) U.S. Pat. No. 5,302,437 (Idei et al); U.S. Pat. No. 5,206,071 (Atherton et al.); and EPO Patent Publication 0484 016 A1.

One prior activity has combined a fluid management system with a pigment management system, as disclosed in copending, coassigned, U.S. patent application Ser. No. 08/892,902, the disclosure of which is incorporated herein by reference. This work solves the need for an inkjet receptor to have both a pigment management system for flocculating or agglomerating incoming pigment/dispersant particles and a fluid management system for efficiently dispensing with the carrier fluids within a porous substrate.

Another prior activity has used ink migration inhibitors that are based on a copolymer is comprised of at least two different hydrophilic monomers, each of whose homopolymers are hydrophilic yet the resulting copolymer from the different hydrophilic monomers is sparingly soluble in water. Copending, coassigned, U.S. patent application Ser. No. 09/099,956 (Waller et al.) discloses such ink migration inhibitors that operate in a single stage manner.

SUMMARY OF INVENTION

It has been found that inkjet receptor media requires durability for exposure to water in the form of humidity, rain, dew, snow, and the like.

It has also been found that pigment particles in aqueous inkjet ink formulations require time to establish a stable relationship with the medium upon which they have been deposited during inkjet printing.

It has been found that pigment particles are capable of migration within pores of a porous inkjet receptor medium, even if such receptor medium has both a fluid management system and a pigment management system.

Copending, coassigned, U.S. patent application Ser. No. 09/099,956 (Waller et al.) provides a "single stage" ink migration inhibitor because it provides a rapid establishment of a stable relationship between pigment particles (and their dispersants) and the inkjet receptor medium, particularly when the printed medium is likely to be exposed to water shortly after printing.

However, it has now been found that pigment particles require the use of a "multi-stage" ink migration inhibitor because there are inkjet receptor media which do not prefer first stage ink migration inhibitors.

"Multi-stage" ink migration inhibitors differ from "single stage" ink migration inhibitors in two critical characteristics: (1) the multi-stage inhibitor compositions are quite soluble in water unlike the single stage ink migration inhibitors that are sparingly soluble in water; and (2) the multi-stage inhibitor compositions act more aggressively initially to establish the stable relationship between the pigment particles (and their dispersants) and the inkjet receptor medium with the inhibitors' second stage functioning in the same manner as the single stage inhibitors of the present art.

One skilled in the art can choose among use or single-stage inhibitors, multi-stage inhibitors, or both, depending on the particular requirements of the ink and media characteristics. In any of these possibilities, the art now has a means for inhibiting ink migration when the image graphic encounters water or an excessively humid environment.

One aspect of the present invention is a multi-stage migration inhibitor for pigmented inks comprising a polymer having quaternary amine functional groups, wherein the polymer is quite soluble in water.

For purposes of this application, "quite soluble in water" means dissolution of the monomer in deionized water at room temperature (about 15–18° C.) in an amount of 50–90 grams/100 g of water.

Pigmented inkjet inks include both thermal inkjet inks and piezo inkjet inks. Preferably, such inks are aqueous inkjet inks.

One feature of the present invention is a polymer comprising quaternary amine functional group(s) that are quite soluble in water and can complex with pigmented inks and their dispersants to create insoluble higher molecular weight complexes. The new complex formed in a porous inkjet receptor medium becomes essentially water-fast from additional water or moisture. Sources of water are typically from the environment in the form of humidity, rain, snow, etc.

It is believed that kinetics of the complexation of components of ink and the quaternary amine functional groups involves hydrophilic interaction in the same manner as disclosed in copending, coassigned, U.S. patent application Ser. No. 09/099,956 (Waller et al.) but more aggressively and rapidly than occurs with the sparingly soluble homopolymers and copolymers used in that single stage complexation because the quite soluble polymers of the present invention are more easily dissolved by ink carrier fluids. Because polymers of the present invention are "multi-stage" ink migration inhibitors, the polymers of the present invention can both aggressively and rapidly complex with any ink components that need inhibition from migration and then more conventionally scavenge for any ink components that need inhibition from migration.

The need for a multi-stage ink migration inhibitor arises from the fact that the quality of the printing inks is uncontrollable and can vary from lot to lot. Also, the properties of the inkjet receptor media can vary from lot to lot. These variations cause other changes, which have led to the need for a more aggressive migration inhibitor. A multi-stage inhibitor of the present invention solves the problems resulting from lot variations.

"Hydrophilic interaction" in the present context means a physicochemical phenomenon whereby the functional group (s) in the multi-stage ink migration inhibitor undergoes interactions with the dispersants and the ions in hydrophilic medium.

One advantage of the present invention is that a quite soluble polymer of the present invention can substantially immobilize pigment particles and their associated dispersants from migration when the printed inkjet receptor medium comes in contact with water, but in a manner that either complements or replaces the use of single-stage ink migration inhibitors that occupy a later or last stage of the multi-stage ink migration inhibitor.

In addition, ternary polymers of the present invention increase optical density of images and allows for a better imbibing solution along with the other receptor ingredients for coating porous media to make useful inkjet receptor media. This is because there can be a greater loading of the multi-stage ink migration inhibitors of the present invention in the coating solutions used to prepare the inkjet receptor medium. There are also better flocculating properties in a multi-stage manner described above.

Thus, the present invention provides an inkjet receptor medium, that includes: a porous membrane; and a multi-stage migration inhibitor for pigmented inks, comprising a polymer having quaternary amine functional groups, wherein the polymer is quite soluble in water. Preferably, the polymer has a formula P(X/Y/Z) where X is a pyrrolidone-containing polymerized monomer; Y is an acid-containing polymerized monomer; and Z is a quaternary amine-containing polymerized monomer.

Other features and advantages of the invention be disclosed in relation to the embodiments of the invention, using the following drawings.

PREFERRED EMBODIMENTS OF THE INVENTION

Inkjet Receptor Medium

Figure 1:
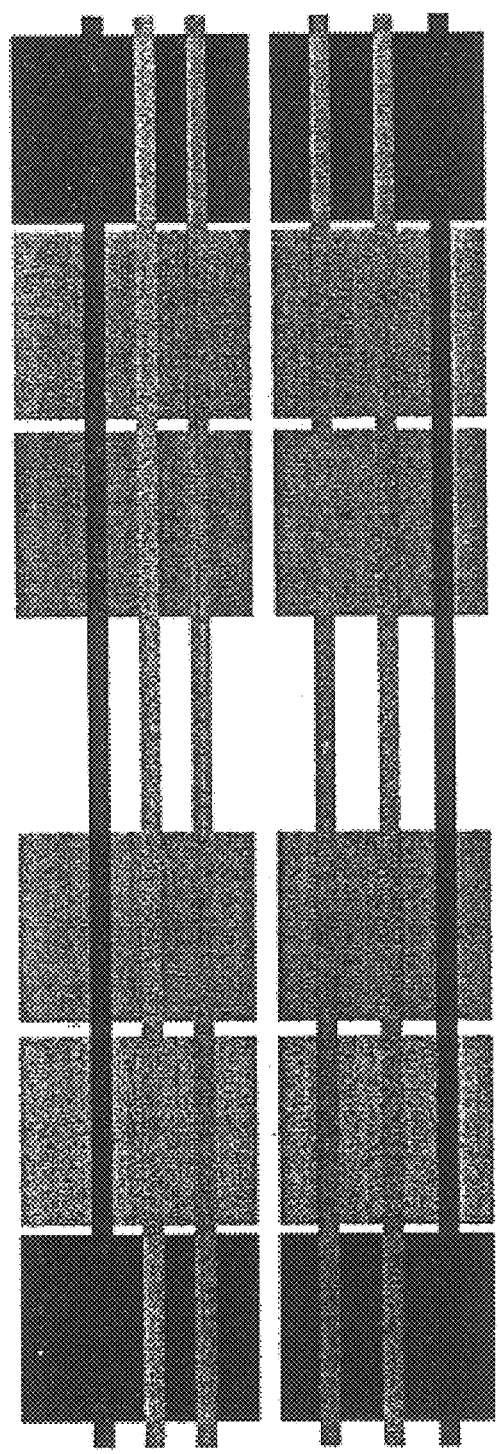
FIG. 1 is a comparison color digital image showing pigment migration when inkjet receptor medium has not employed the pigment migration inhibitor of the present invention.

The inkjet receptor medium can be any porous membrane or film known to those skilled in the art wherein it is desired to print inkjet inks on at least one major surface thereon. Preferably, the porous membrane is a microporous membrane, more preferably, a phase separated microporous membrane (e.g., a phase inversion membrane, which can be wet or dry, as described in R. E. Kesting, *Synthetic Polymeric Membranes: Structural Perspective*, 2d ed., John Wiley & Sons, 1985, Chapter 7, pages 237–285), and most preferably, a thermally induced phase separated (T.I.P.S.) microporous membrane of the type disclosed in U.S. Pat. No. 4,539,256 (Shipman), U.S. Pat. No. 4,726,989 (Mrozinski), U.S. Pat. No. 5,120,594 (Mrozinski), U.S. Pat. No. 4,867,881 (Kinzer), and U.S. Pat. No. 4,247,498 (Castro). Another microporous membrane is TESLIN, which is made according to the procedures of U.S. Pat. No. 4,892,779 (Leatherman), which requires "processing with plasticizer to a uniform mixture," extraction, and stretching. These process activities or techniques are traditionally used for membrane formation. Similar products made according to the procedures of U.S. Pat. No. 4,613,441 (Kohno) would also be considered as microporous membranes for use with this invention.

Preferably, the medium is an inkjet receptor medium that includes a porous substrate having a fluid management system and a pigment management system impregnated into the pores of the porous substrate such that these systems are in contact with surfaces of the pores of the substrate therein, such as disclosed in copending, coassigned, U.S. patent application Ser. No. 08/892,902 and related PCT Publication WO 99/03685. One embodiment of that medium is an inkjet receptor comprising a microporous membrane impregnated with an inorganic multivalent metal salt together with a surfactant or combination of surfactants chosen for the ink and membrane being employed. A variety of surfactants can be chosen to provide particularly suitable surfaces for the particular fluid components of the pigmented inkjet inks. Surfactants can be cationic, anionic, nonionic, or zwitterionic.

Another embodiment is an inkjet receptor comprising a microporous membrane impregnated with a microporous fluorinated silica agglomerate together with a binder and a surfactant or a combination of surfactants for the ink and membrane being employed.

Another embodiment of the present invention is an inkjet receptor comprising a microporous membrane impregnated with a microporous fluorinated silica agglomerate together with a binder and a surfactant or combination of surfactants, wherein the said surfactants are selected from the group of hydrocarbon-based anionic surfactants, silicon-based non-ionic surfactants or fluorocarbon-based non-ionic based surfactants or a combination thereof.

These receptors, when imaged in an inkjet printer, provide very high density and very high quality images, which are tack-free and instantaneously dry to touch.

The ink colorant is typically a pigment dispersion having a dispersant that binds to the pigment that will destabilize, flocculate, agglomerate, or coagulate the pigments on contact with the media component. According to the present invention, depositing each of the colors at or just below the surface of the membrane allows the carrier fluid to wick into the membrane where the fluid management system can take over, while providing a sheltered location for the pigments as managed by the pigment management system.

For particularly preferred embodiments, the inkjet receptor medium uses a Thermally Induced Phase Separated (T.I.P.S.) microporous membrane of the type disclosed in U.S. Pat. No. 4,539,256 (Shipman), U.S. Pat. No. 4,726,989 (Mrozinski), and U.S. Pat. No. 5,120,594 (Mrozinski), and available from 3M Company (St. Paul, Minn.). For optimization, the pore size and pore volume of the porous film can be adjusted for the model or make of the ink jet printer to correctly hold the volume of ink dispensed by the printer ensuring the highest possible image quality. A particularly preferred microporous membrane for the present invention when printing with a 35 picoliter/drop×4 colors× 600×600 drops/inch, for example, is a polypropylene membrane prepared using thermally induced phase separation techniques according the disclosures of U.S. Pat. No. 4,539,256 (Shipman et al.), U.S. Pat. No. 4,726,989 (Mrozinski), and more particularly U.S. Pat. No. 5,120,594 (Mrozinski),. Preferably, the polypropylene membrane is co-extruded with a mineral oil followed by bi-axial stretching under thermal conditions.

The coating on the preferred media/ink set has special utility in the demanding ink jet printing applications found in commercial printing. Thus, one can "fine tune" the properties of these receptors to deal with the variables of inkjet ink delivery, including without limitation: porosity of media, pore size, surface wetting energy, and other capacity issues for media to receive ink of various formulations and drop volumes. Moreover, these media exhibit a complex porosity in its porous material that provides both a tortuous path for fluid management and a tortuous path that ensnares the pigment initially and continually during ink delivery.

Pigment Management System

The microporous material has a pigment management system based on addition of materials into the pore volume of the porous substrate.

Two embodiments are disclosed for the Pigment Management System: Silica Agglomerates and Multivalent Metal Salts. There are benefits of both and some distinctions that can be employed by those skilled in the art to advantage.

Both embodiments provide a quick dry, high color density, high resolution image that is smudge resistant (if the silica agglomerates reside below the exposed surface of the receptor medium).

The silica agglomerate embodiment works with both dye-based and pigment-based inks, whereas the metal salt embodiment works better with pigment-based inks.

The silica agglomerate is not soluble in water either for preparing imbibing solutions or after imaging. The metal salt is soluble in water for both preparing solutions and during imaging, but not after complexing with the dispersing aid that surrounds the pigment particles in the ink.

The silica agglomerate is composed of particles trapped inside the porous receptor medium, whereas the metal salt is composed of coatings on the interior surfaces of the porous receptor medium.

The silica agglomerate is believed to serve as a chemical trap, a functionalized silica, of ink passing through the interior pores interacting with dispersants that surround pigment particles, leaving the colorant with the agglomerate, providing a chemical means of pigment management based on particulates within the pores. The metal salt is believed to serve as reagents to rapidly destabilize dispersants surrounding the pigment particles in the ink, whereby the pigment particles coagulate or flocculate as the remainder of the ink fluid continues through pores and along the surfaces of the receptor medium. The multivalent salts therefore provide a chemical means of pigment management along surfaces of the pores.

The former requires penetration into the porous receptor medium to minimize physical removal from the medium. The latter coats surfaces of the receptor medium and, once dried, is resistant to physical removal.

One way to qualify various pigment management systems is to place a quantity of the targeted ink into a solution of a pigment management system. A non-particulate chemical acting as in pigment management will flocculate and a separate the pigment particles from the ink, rapidly separating the appearance of the experimental liquid into two layers, whereas a particulate chemical acting pigment management will not separate rapidly the experimental liquid into two layers.

Pigment Migration Inhibitor

Pigment migration inhibitors useful in the present invention can be polymers containing a quaternary amine functional group according to the following general formula I:

$$P(X/Y/Z) \qquad\qquad I$$

Wherein "P(X/Y/Z)" represents a polymer of copolymerized monomers X, Y, and Z; X is a pyrrolidone-containing polymerized monomer; Y is an acid-containing polymerized monomer; and Z is a quaternary amine-containing polymerized monomer.

The amount in weight percent of the X monomer in the polymer ranges from about 30 weight percent to about 66 weight percent of the total polymer, and preferably from about 40 weight percent to about 50 weight percent.

The amount in weight percent of the Y monomer in the polymer ranges from about 10 weight percent to about 32 weight percent of the total polymer, and preferably from about 10 weight percent to about 20 weight percent, The ratio of weights of the X monomer to the Y monomer ranges from about 2:1 to about 4:1, and preferably is about 3:1.

The amount in weight percent of the Z monomer in the polymer ranges from about 2 weight percent to about 50 weight percent of the total polymer, and preferably from about 30 weight percent to about 45 weight percent.

Nonlimiting examples of polymers of formula I include poly(vinylpyrrolidone-co-acrylic acid-co-dimethylaminoethyl acrylate methylchloride) abbreviated as "P(NVP/AA/DMAEA-CH$_3$Cl)"; poly(vinylpyrrolidone-co-acrylic acid-co-dimethylaminoethyl methacrylate methylchloride) abbreviated as "P(NVP/AA/DMAEMA-CH$_3$Cl)"; poly(vinylpyrrolidone-co-acrylic acid-co-dimethylaminoethyl methacrylate benzylchloride) abbreviated as "P(NVP/AA/DMAEMA-BenzylCl)"; and poly (vinylpyrrolidone-co-acrylic acid-co-dimethylaminoethyl methacrylate hexadecanebromide) abbreviated as "P(NVP/AA/DMAEMA-C$_{16}$H$_{33}$Br)".

Preferably, a polymer used in the present invention is P(NVP/AA/DMAEA-CH$_3$Cl) and has the following formula II:

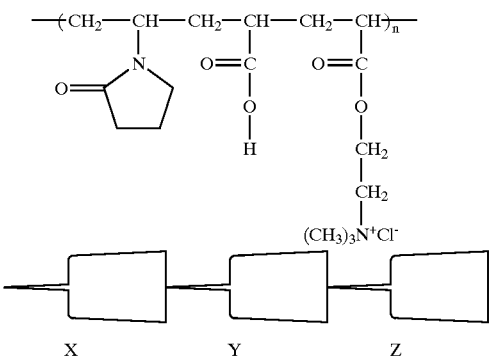

Polymers of the present invention are synthesized by a reaction of the X, Y, and Z monomers in the appropriate weight ratios identified above.

Molecular weight (Number Average) has been been found to be significant for performance of the inhibitor polymers of the present invention. The molecular weight of the polymer can range from about 10,000 to about 300,000, preferably from about 20,000 to about 200,000, and more preferably from about 30,000 to about 100,000 (greater than about 35,000).

Once monomers are selected, the polymerization is rather less complicated. Mixing the monomers in appropriate solvent with the right amount of initiator and subjecting the mixture to mild heating allows the polymerization reaction to take place in reasonable time frame. The initiator concentration has to be adjusted in such a way so that in a given set of monomer concentrations, the copolymer with the desired molecular weight is obtained with 95–99% conversion.

The comonomer ratios determining composition of the polymer is important. These ratios reflect not only the solubility of the polymer in a water-based composition but also determines the polymers' inhibitor properties towards the pigment mobility. The multi-stage ink migration inhibition is based on the unexpected properties of a P(X/Y/Z) of formula I. The quaternary amine-containing Z monomer provides aggressive and rapid inhibition of ink migration, whereas the combination of the X and Y monomers serves as the slower, more scavenging ink migration inhibitor. This multi-stage ink migration inhibitor property of polymers of formula I are versatile for the different types of pigments employed in inkjet inks. For example, it has been found that the most likely pigments to migrate are cyan and yellow. Multi-stage ink migration inhibitors are particularly suitable for inhibiting ink migration because of the presence of the Z monomer in the polymer of formula I, while the magenta and black pigments are ably served by the X and Y monomers of formula I. Providing a versatile flocculating agent as a multi-stage ink migration inhibitor of the present invention assures that any likely printing pigment will be inhibited from migration over dwell times ranging from immediate, total immersion after printing to months of natural exposure in outdoor climates.

In other words, a terpolymer of acrylic acid, (N-vinyl-2-pyrrolidinone), and DMAEA-CH$_3$Cl provides a balance of properties for both high density and low pigment mobility and does not adversely interfere with other properties such as fluid management and other pigment management such as flocculation/agglomeration of the pigment particles. Polymerization of X, Y, and Z monomers to form a polymer can employ any conventional polymerization technique, among them including, bulk polymerization, emulsion polymerization, and solution polymerization, with the last being presently preferred. Such polymerization processes can be effected by conventional procedures, among them including, anionic, cationic, and free-radical polymerization, with the last being presently preferred.

After polymerization of the inhibitor polymer (i.e, copolymer, which is used herein to refer to polymers containing more than one type of monomer, such as the terpolymers listed above), the inhibitor polymer is added to a coating solution, such as disclosed in copending, coassigned, U.S. patent application Ser. No. 08/892,902, for coating on the inkjet receptor medium. The weight percent of the inhibitor polymer in the coating solution can range, depending on the molecular weight, from about 1 weight percent to about 10 weight percent, based on the total weight of the coating solution,in order to minimize deleterious effects on other printing properties, and preferably from about 2 weight percent to about 7 weight percent, and more preferably from about 3 weight percent to about 6 weight percent. These weight percents can be higher than the weight percents for a copolymer that does not include the Z monomer because the presence of the Z monomer groups (quaternary amine groups) in the polymer of formula I converts the polymer from being sparingly soluble in water to quite soluble in water.

Optional Additives

In addition to the migration inhibitor of the present invention, one can add other compounds to improve image quality and stability. For example, to overcome the presence of any residue residing on the exposed surface of a porous inkjet medium, where the pigment particles are supposed to be nested within the porous surfaces of the medium, one can add a drying agent to the coating solution used to load a fluid management system and/or a pigment management system to a porous medium. One example of a drying agent is any of those disclosed in copending, coassigned, U.S. patent application Ser. No 09/099,961 (Waller et al.). Pigment drying agents useful in embodiments of that medium can be aromatic or aliphatic acids having sulfonic, carboxylic, phenolic or mixed functionalities thereof.

USEFULNESS OF THE INVENTION AND EXAMPLES

It has been found that ink migration of the pigment particles can occur when a portion of a printed inkjet medium protected by an overlaminate is partially submerged in water and capillary forces cause continuous water flow within the overlaminated printed medium within the submerged portion to other locations within the submerged portion and sometimes to the unsubmerged portion. This continuous water flow in true capillary action transports pigment particles within various locations in the submerged portion and sometimes to the unsubmerged portion, leaving transported pigment particles in unintended locations which distorts the intended image. This phenomenon can be noticeable within minutes or can occur only after several hours of submersion of a portion of the printed ink. This noticeable ink migration is in a manner like thin layer chromatography. The compositions of the present invention inhibit this ink migration, delaying the phenomenon from minutes to weeks or more. Any edge of a laminated printed inkjet image or a disruption in the overlaminate can be a source for water flow or capillary action. Pigment migration could occur unless the compositions of the present invention are employed to inhibit pigment migration. The amount of water flow via capillary action can also determine the amount of migration, but printed inkjet images should be designed for possible severe conditions than to risk loss of image quality or image assurance.

FIG. 1 shows an color digital image graphic of several colors of HP2500 Series brand pigmented inkjet inks (commercially available from Hewlett Packard Corporation of Palo Alto, Calif., USA) printed in an image of a test pattern on an inkjet receptor medium, namely, an oil-in microporous polypropylene membrane prepare according the disclosures of U.S. Pat. No. 4,539,256 (Shipman et al.), U.S. Pat. No. 4,726,989 (Mrozinski), and more particularly U.S. Pat. No. 5,120,594 (Mrozinski), the disclosures of which are incorporated herein by reference The membrane was treated with a coating of various inhibitor compositions as seen in Table 1.

TABLE 1

Inhibitor Compositions (Weight Percents) and Percent Coating Solutions

| Compound | Comparison A | Example 1 | Comparison B | Example 2 |
| --- | --- | --- | --- | --- |
| Aluminum sulfate, tetradecahydrate | 2.9 | 2.9 | 2.4 | 2.4 |
| Dicyclohexylsulfosuccinate | 5.8 | 5.8 | 4.8 | 4.8 |
| D,L-2-Pyrrolidone 5-carboxylic acid | 2.0 | 2.0 | 1.6 | 1.6 |
| Dihexylsulfosuccinate | 3.0 | 3.0 | 2.5 | 2.5 |
| 5-Hydroxyisophthalic acid | 3.9 | 3.9 | 3.3 | 3.3 |
| P(NVP/AA) | 2.1 | — | 6.0 | — |
| P(NVP/AA/DMAEA-CH$_3$Cl) | — | 2.1 | — | 6.0 |
| Isopropanol | 9.6 | 9.6 | 8.0 | 8.0 |
| Ethanol | 20.5 | 20.5 | 26.6 | 26.6 |
| 2-Pentanol | 4.8 | 4.8 | 4.0 | 4.0 |
| De-ionized water | 45.4 | 45.4 | 40.8 | 40.8 |
| Molecular Weight (Mn) | | | | |
| Percent Solution | 2.1 | 2.1 | 6.0 | 6.0 |

Each of the Examples A, 1, B, and 2 were coated on a membrane.

This membrane had the following properties:

| | |
| --- | --- |
| Bubble point | 0.75 μm |
| Gurley 50 cm$^3$ | 20 sec |
| Porosity % void | 41% |
| Surface wetting Energy (before treatment) | 30 dynes/cm$^2$ |
| Caliper | 0.178 mm (7 mil) |

The only effective difference between Examples A and 1 was the use of P(X/Y) for Example A while P(X/Y/Z) was used for Example 1. The difference between the set of Examples A and 1 and the set of Examples B and 2 was the percentage of composition added to the imbibing solution for the membrane: 2% vs. 6%.

The composition was coated onto the membrane with a No. 4 Meyer bar. The printed medium was laminated with 3M Overlaminate No. 8519CP from its Commercial Graphics Division, St. Paul, Minn. and the laminated medium was adhered to a piece of clear polyester and approximately 75% percent was submerged within 30 minutes from printing in water for a period of 24 hours. During this time of submersion, the image on Example A deteriorated due to pigment migration of the cyan and yellow pigments, as seen in FIG. 1.

Figure 2:
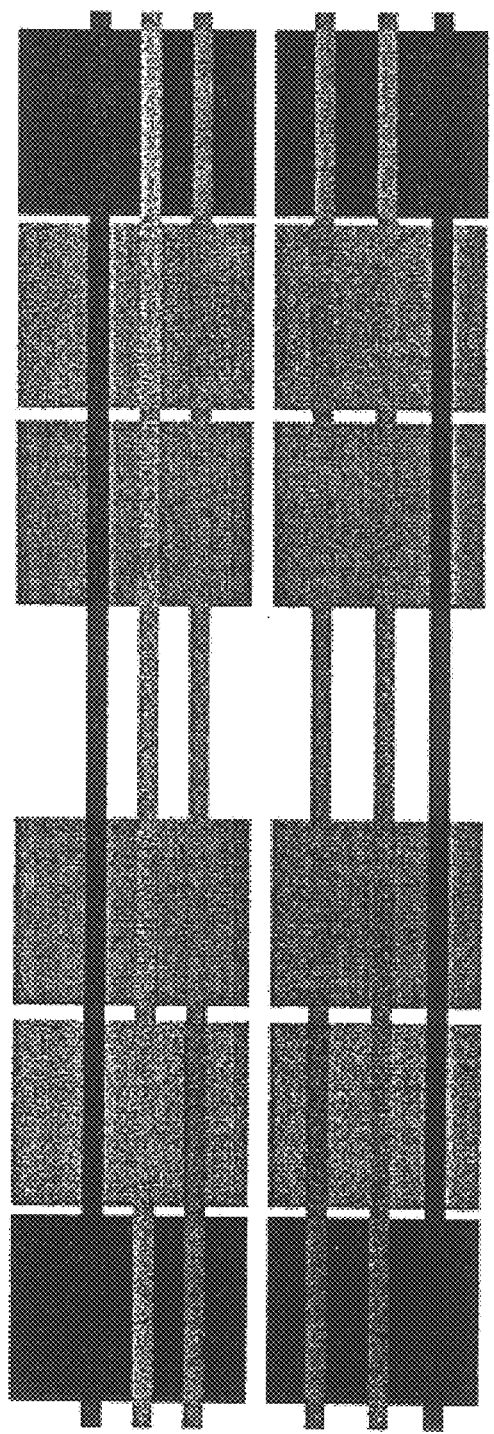
FIG. 2 is a color digital image showing substantially no pigment migration under the same conditions as seen in FIG. 1, except that the inkjet receptor medium has employed the pigment migration inhibitor of the present invention.

FIG. 2 shows the results for Example 1. The submersion resulted in substantially no wicking of any color to the waterline or above the waterline for 24 hours under eye examination.

Figure 3:
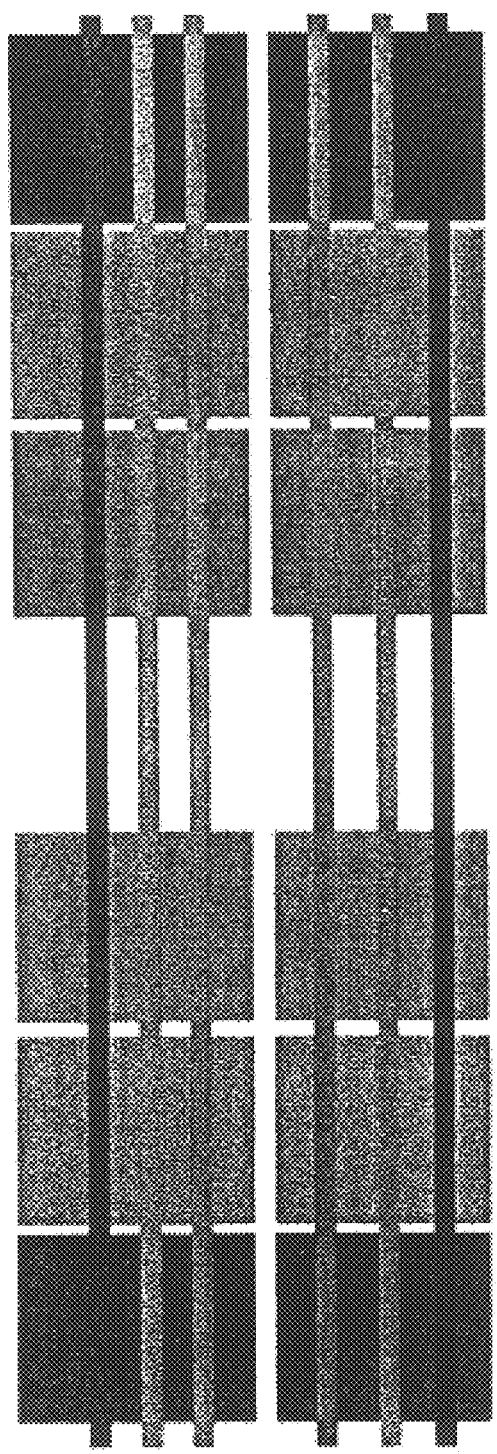
FIG. 3 is another comparison color digital image showing pigment migration when inkjet receptor medium has not employed the pigment migration inhibitor of the present invention, but at a different concentration than used as seen in FIG. 1.
Figure 4:
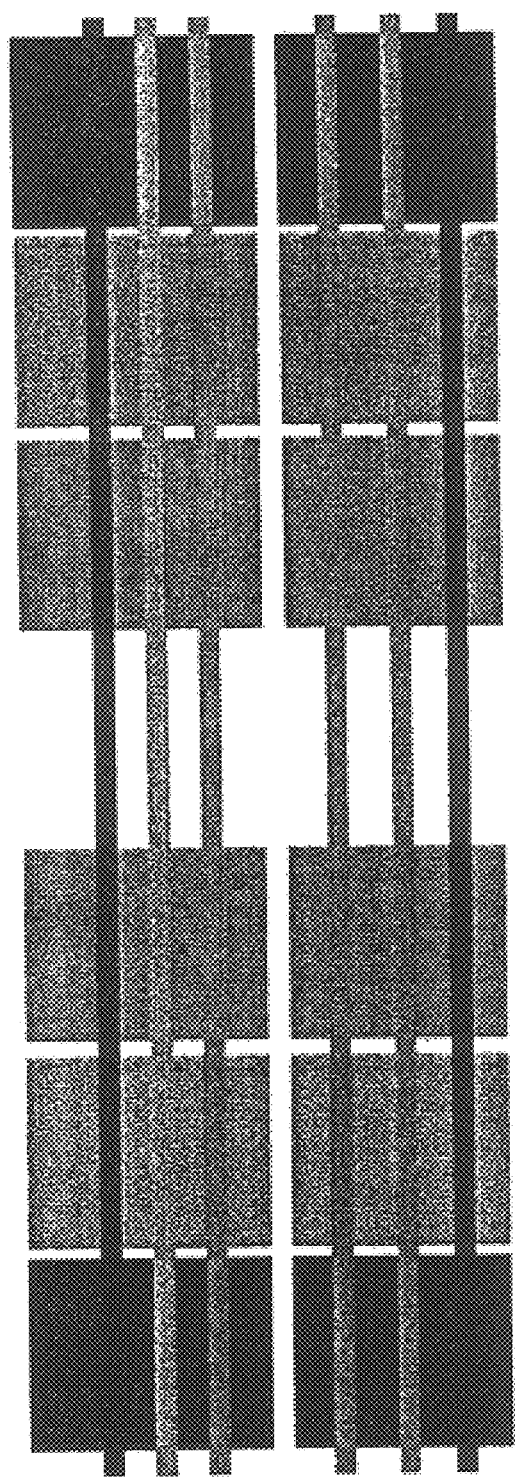
FIG. 4 is a color digital image showing substantially no pigment migration under the same conditions as seen in FIG. 3, except that the inkjet receptor medium has employed the pigment migration inhibitor of the present invention, but at a different concentration than used as seen in FIG. 2.

Similar results were obtained for Examples B and 2 as seen in FIGS. 3 and 4, respectively, but Example B had difficulty in coating the imbibing solution because of the sparingly soluble nature of the P(X/Y) single stage migration inhibitor, whereas Example 2 performed very well during preparation and testing. Indeed, Example 2 had superior results to Example 1 in inhibiting migration of cyan and, yellow pigments.

Figure 5:
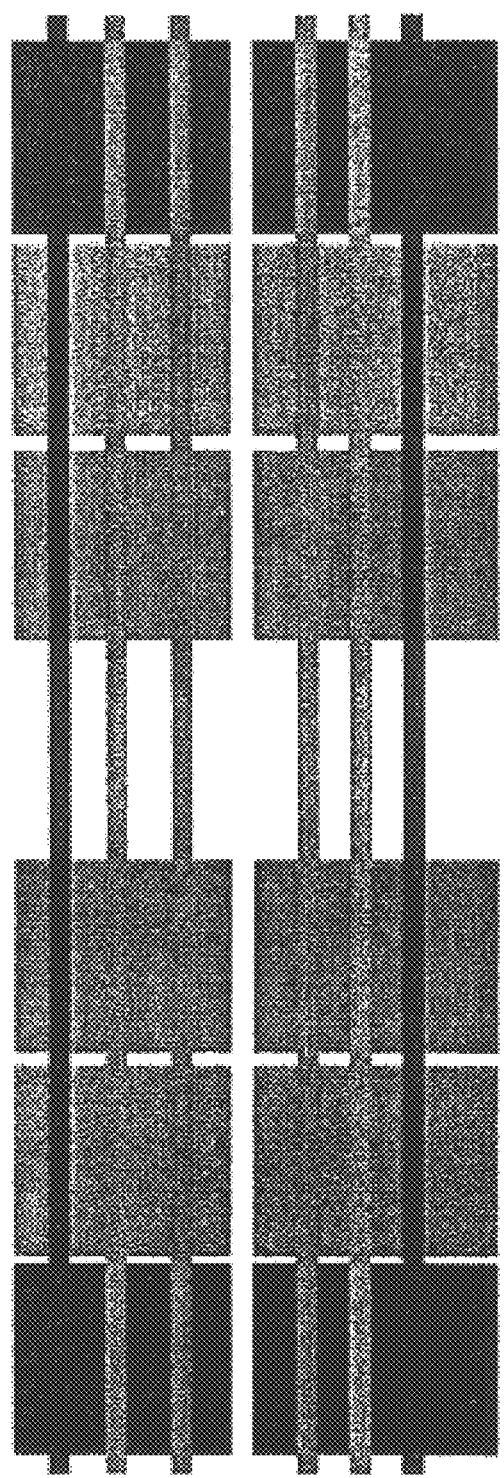
FIG. 5 is a comparison color digital image showing pigment migration when inkjet receptor medium has not employed the pigment migration inhibitor of the present invention, with the same concentration as in FIG. 1 but at a different time of onset of water exposure.
Figure 6:
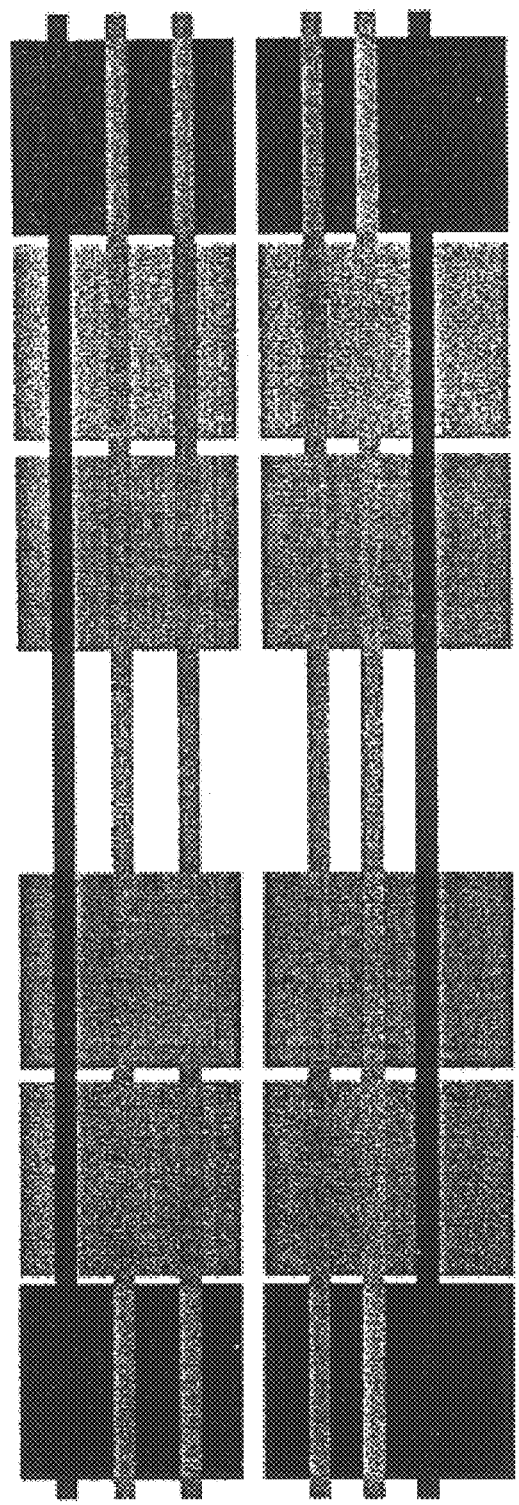
FIG. 6 is a color digital image showing substantially no pigment migration under the same conditions as seen in FIG. 5, except that the inkjet receptor medium has employed the pigment migration inhibitor of the present invention with the same concentration as in FIG. 2 but at a different time of onset of water exposure.
Figure 7:
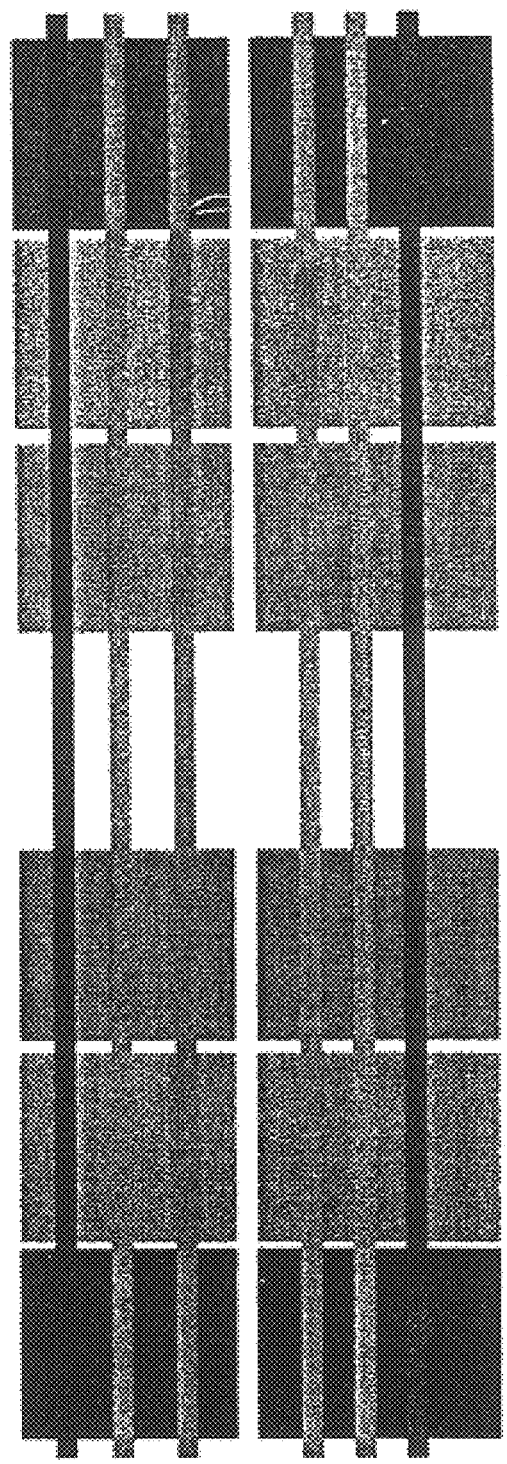
FIG. 7 is another comparison color digital image showing pigment migration when inkjet receptor medium has not employed the pigment migration inhibitor of the present invention, but at a different concentration than used as seen in FIG. 5 even though the onset of water exposure was the same.
Figure 8:
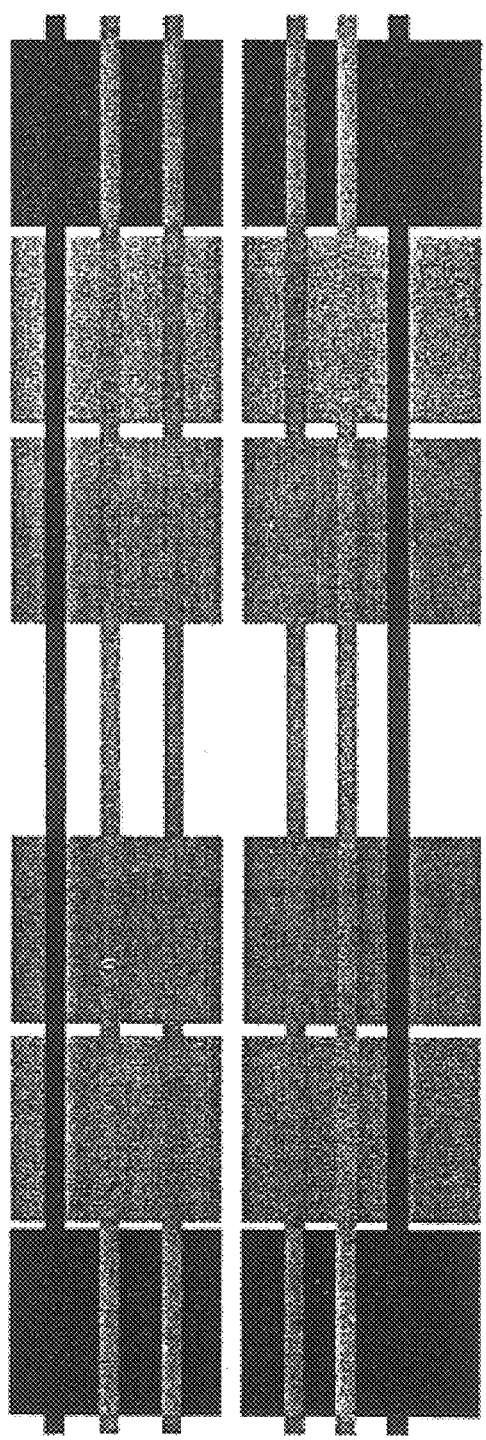
FIG. 8 is a color digital image showing substantially no pigment migration under the same conditions as seen in FIG. 7, except that the inkjet receptor medium has employed the pigment migration inhibitor of the present invention, but at a different concentration than used as seen in FIG. 6 even though the onset of water exposure was the same.

Examples A and 1 and B and 2 were also tested under the same conditions as described above, except that the onset of time of water exposure, i.e., the partial immersion did not begin until four days after the printing, instead of 30 minutes. In each of these Examples A (FIG. 5), 1 (FIG. 6), B (FIG. 7), and 2 (FIG. 8), the longer dwell time before immersion improved the waterfastness of the test images. But use of the P(X/Y/Z) was still an improvement over the P(X/Y).

A comparison of the image graphics seen in FIGS. 1–8 shows the improvement ink migration inhibition comparing:

(a) the use of P(X/Y): FIGS. 1, 3, 5, and 7 vs. the use of P(X/Y/Z): FIGS. 2, 4, 6, and 8;

(b) different concentrations of inhibitors: FIGS. 1, 2, 5, and 6 vs. FIGS. 3, 4, 7, and 8; and (c) different onset times for water exposure: FIGS. 1–4 vs. FIGS. 5–8.

The embodiment shown in FIG. 4 is presently preferred because a higher concentration provides stronger first stage protection against ink migration.

Failure of the test for migration will be seen usually within the first 2 days after immersion. It is presently believed that the inhibition of this invention continues indefinitely and longer than any anticipated length of image display in water-containing environments, because the combination of the slower X/Y monomers continue to scavenge for uncomplexed pigment particles in the membrane. Indeed, the results seen in FIGS. 5–8 indicate that the slower X/Y monomers provide that scavenging effect to narrow the gap of performance between the P(X/Y) inhibitors and the P(X/Y/Z) inhibitors. But in designing an inkjet receptor medium, one can not know the earliest time that the image graphic could become exposed to water, making the P(X/Y/Z) inhibitors of the present invention unexpectedly valuable because of its first stage properties in the multi-stage inhibition process.

Objects and advantages of this invention are illustrated by these examples, but the particular materials and amounts thereof recited therein, as well as other conditions and details, should not be construed to unduly limit this invention. The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. An inkjet receptor medium suitable for imaging with a pigmented ink, comprising:
   a porous membrane;
   a pigment management system comprising a multivalent metal salt coating or functionalized particulates in contact with surfaces of pores of the porous membrane; and
   a multi-stage migration inhibitor for pigmented inks, comprising a polymer having quaternary amine functional groups, wherein the polymer is quite soluble in water.

2. The inkjet receptor medium of claim 1, wherein the polymer has a formula:

$$P(X/Y/Z)$$

where X is a pyrrolidone-containing polymerized monomer; Y is an acid-containing polymerized monomer; and Z is a quaternary amine-containing polymerized monomer.

3. The inkjet receptor medium of claim 2,
   wherein the amount of the X monomer ranges from about 30 weight percent to about 66 weight percent of the total polymer;
   the amount of the Y monomer ranges from about 10 weight percent to about 32 weight percent of the total polymer; and
   the amount of the Z monomer ranges from about 2 weight percent to about 50 weight percent of the total polymer.

4. The inkjet receptor medium of claim 2,
   wherein the amount of the X monomer ranges from about 40 weight percent to about 50 weight percent of the total polymer;
   the amount of the Y monomer ranges from about 10 weight percent to about 20 weight percent of the total polymer; and
   the amount of the Z monomer ranges from about 30 weight percent to about 45 weight percent of the total polymer.

5. The Inkjet receptor medium of claim 1, wherein the polymer has a number average molecular weight ranging from about 10,000 to about 300,000.

6. The inkjet receptor medium of claim 1, wherein the Z monomer is selected from the group consisting of dimethylaminoethyl acrylate methylchloride; dimethylaminoethyl methacrylate methylchloride; dimethylaminoethyl methacrylate benzylchloride; and dimethylaminoethyl methacrylate hexadecanebromide.

7. The inkjet receptor medium of claim 1, wherein the polymer is N-vinyl-2-pyrrolidinone-co-acrylic acid-co-dimethylaminoethylacrylate methylchloride.

8. The inkjet receptor medium of claim 1, wherein the porous membrane is a microporous membrane with tortuous paths.

9. The inkjet receptor medium of claim 1, wherein the porous membrane is a phase separated microporous membrane.

10. The inkjet receptor medium of claim 9, wherein the phase separated microporous membrane is a thermally induced phase separated microporous membrane.

11. The inkjet receptor medium of claim 1, wherein the porous membrane comprises a fluid management system and a pigment management system impregnated into pores of the porous membrane.

12. The inkjet receptor medium of claim 11, wherein the pigment management system comprises fluorinated silica agglomerate.

13. The inkjet receptor medium of claim 12, wherein the fluid management system comprises a surfactant.

14. The inkjet receptor medium of claim 1, wherein the porous membrane is impregnated with an inorganic multivalent metal salt.

15. The inkjet receptor medium of claim 14, wherein the porous membrane is further impregnated with a surfactant.

16. An inkjet receptor medium, comprising
   (a) a microporous phase separated membrane, and
   (b) a multi-stage migration inhibitor for pigmented inks impregnated into the microporous membrane comprising a polymer having quaternary amine functional groups, wherein the polymer is quite soluble in water.

17. The medium of claim 16, further comprising a drying agent impregnated into the microporous membrane.

18. The medium of claim 16, further comprising an image graphic thereon.

19. A method of preparing an inkjet receptor medium, the method comprising providing a porous membrane and applying a pigment management system comprising a multivalent metal salt coating or functionalized particulates in contact with surfaces of pores of the porous membrane, and a multi-stage migration inhibitor for pigmented inks comprising a polymer having quaternary amine functional groups, wherein the polymer is quite soluble in water.

20. A method of forming an image comprising providing the inkjet receptor medium of claim 1 and printing an image graphic comprising a pigmented ink thereon.

21. The inkjet receptor medium of claim 15, wherein the surfactant is an anionic surfactant.

22. The inkjet receptor of claim 17, wherein the drying agent comprises an aromatic or aliphatic acid having sulfonic, carboxylic, phenolic, hydroxyl or mixed functionalities thereof.

* * * * *

UNITED STATES PATENT AND TRADEMARK OFFICE
CERTIFICATE OF CORRECTION

PATENT NO.    : 6,514,599 B1                                    Page 1 of 1
DATED         : February 4, 2003
INVENTOR(S)   : Ali, Mahfuza B.

It is certified that error appears in the above-identified patent and that said Letters Patent is hereby corrected as shown below:

<u>Title page,</u>
Item [56], U.S. PATENT DOCUMENTS, "4,732,986" should read -- 4,732,786 --.
FOREIGN PATENT DOCUMENTS, please add
-- EP 0484016B1 9/1995 B41M/5/00 --.

<u>Column 4,</u>
Line 4, "use or" should read -- use of --.

<u>Column 8,</u>
Line 18, delete the word "a" at the end of the line.

<u>Column 11,</u>
Line 13, "prepare accordingly" should read -- prepared accordingly --.

<u>Column 13,</u>
Line 44, "The Inkjet" should read -- The inkjet --.

Signed and Sealed this

Ninth Day of September, 2003

JAMES E. ROGAN
*Director of the United States Patent and Trademark Office*